US012015744B1

(12) United States Patent
    Chikkala

(10) Patent No.: US 12,015,744 B1
(45) Date of Patent: Jun. 18, 2024

(54) SYSTEMS AND METHODS FOR LARGE DOCUMENT TRANSFER AND DECENTRALIZED STORAGE

(71) Applicant: Open Text SA ULC, Halifax (CA)

(72) Inventor: Kanaka Srinivas Chikkala, Hyderabad (IN)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 18/338,091

(22) Filed: Jun. 20, 2023

(51) Int. Cl.
    *H04N 1/00* (2006.01)
    *H04N 1/21* (2006.01)
(52) U.S. Cl.
    CPC ....... *H04N 1/00217* (2013.01); *H04N 1/2183* (2013.01); *H04N 2201/0081* (2013.01)
(58) Field of Classification Search
    None
    See application file for complete search history.

(56) References Cited

U.S. PATENT DOCUMENTS

| 8,484,645 | B2* | 7/2013 | Chandnani | G06F 9/544 |
| | | | | 718/101 |
| 11,249,953 | B2* | 2/2022 | Lee | G06F 16/9024 |

| 2017/0063964 | A1 | 3/2017 | Maltbie et al. | |
| 2022/0255907 | A1* | 8/2022 | Agarwal | H04L 9/12 |
| 2022/0407725 | A1* | 12/2022 | Chai | G06F 16/13 |

FOREIGN PATENT DOCUMENTS

| CN | 111726343 A | | 9/2020 |
| CN | 115080526 A | * | 9/2022 |

* cited by examiner

*Primary Examiner* — Scott A Rogers
(74) *Attorney, Agent, or Firm* — Sprinkle IP Law Group

(57) ABSTRACT

Embodiments provide systems and methods for securely transferring large objects. A computer-implemented method, for example, includes determining whether digital content captured by a content capture device currently qualifies as a large file for transmission, based on a size attribute and a current transmission parameter associated with currently transmitting objects from a content capture system to an enterprise content management system. If the digital content qualifies as a large file, the digital content is encrypted and transmitted to a decentralized storage system for storage, and a content identifier that identifies the encrypted digital content stored in the decentralized storage system is transmitted to the enterprise content management system. Otherwise, the digital content is transmitted from the content capture system to the enterprise content management system.

20 Claims, 7 Drawing Sheets

SYSTEMS AND METHODS FOR LARGE DOCUMENT TRANSFER AND DECENTRALIZED STORAGE

TECHNICAL FIELD

Embodiments of the present disclosure relate to transfer of large objects among various computer systems. More particularly, embodiments relate to controlling transmission of large objects from a content capture device. Even more particularly, some embodiments relate to exporting large documents from a document capture system.

BACKGROUND

Many content capture systems obtain content captured by content capture devices and transfer the captured content to other systems for storage and/or further processing. For example, a content capture system may obtain digital content associated with a document scanned by a scanner device, and export the digital content to a repository of an enterprise content management system. Conventionally, the content capture system may export captured documents using HyperText Transfer Protocol (HTTP) file transfer. For example, POST is a request method supported by HTTP used by the World Wide Web. A POST request may request that a web server accept data enclosed in the body portion of the request message (e.g., for storing the data at a destination server). For example, a POST request may be used when uploading a file or when submitting a completed web form. As part of a POST request, an arbitrary amount of data of any type can be sent to a destination server in the body of the request message. For some environments, a header field in the POST request may indicate a message body's Internet media type, as well as a content length attribute and other information.

For small amounts of digital content (e.g., for small documents, small objects, and/or other files), such export techniques may provide satisfactory results. However, as the size of the digital content (e.g., a document size or file size) increases, the export using HTTP file transfer may utilize more bandwidth and time, which may result in HTTP connection timeout errors and network interruptions. While it may be possible to increase time limits for connection time-outs, system security may become compromised, at least due to slow HTTP attacks.

In general, HTTP servers may be configured to restrict supported file sizes with maximum size limits for various reasons related to performance, security and memory management. In such environments, a configuration setting is provided which may be changed manually when needed. However, manual changes generally involve obtaining appropriate permissions, and tend to consume considerable time and effort. If an error occurs due to network interruptions, the connection may be reset, and then the export operation may need to restart. Generally, HTTP based file transfers for large file sizes thus presents numerous challenges to manage error recovery, and to resume file transfers after network interruptions. Thus, there is a need for improvements and scalable solutions in large object exports for content capture devices such as document capture devices.

SUMMARY

Embodiments of the present disclosure include systems, methods and computer program products for content transmission. Even more particularly, embodiments can obtain digital content captured by a content capture device and determine a size attribute associated with the obtained digital content (e.g., a size of a file comprising the obtained digital content). A transmission parameter associated with transmission of objects to a receiving system may be obtained. An initial destination for the obtained digital content may be selected based on the size attribute and the obtained digital content, by selecting between the receiving system and a decentralized storage system as the initial destination. Embodiments may then initiate transmission of the digital content to the selected initial destination.

One embodiment comprises a system that comprises a processor and non-transitory computer-readable medium storing instructions that are executable by the processor for obtaining digital content captured by a content capture device. A size attribute associated with the obtained digital content is determined. A transmission parameter associated with transmission of objects to a receiving system is obtained. An initial destination for the obtained digital content is selected based on the obtained transmission parameter and the determined size attribute, the selecting including selecting between the receiving system and a decentralized storage system as the initial destination. Transmission of the obtained digital content to the selected initial destination is initiated.

Some embodiments include one or more of the following features. The selected initial destination includes the decentralized storage system, and initiating transmission of the digital content to the selected initial destination includes obtaining an encrypted file of the obtained digital content by initiating encryption of the obtained digital content prior to transmission of the encrypted file to the decentralized storage system. A content identifier (CID) that includes a content address associated with storage of the obtained digital content in the decentralized storage system is obtained. Transmission of the CID to the receiving system is initiated, where the CID includes a content address associated with storage and retrieval of the obtained digital content in the decentralized storage system. The selected initial destination includes the receiving system, and initiating transmission of the digital content to the selected initial destination includes initiating an HTTP POST request that includes the digital content in a body portion of the HTTP POST request, to the receiving system.

Another general aspect of the present disclosure includes a computer-implemented method that comprises receiving, at an enterprise content management system, a message initiated by a content capture system. The received message is parsed to determine whether the received message comprises a content identifier (CID) in a body of the received message, the CID identifying content stored in a decentralized storage system. Responsive to determining that the received message comprises the CID in the body of the received message: providing the CID to the decentralized storage system to initiate retrieval of the content identified by the CID, the content comprising digital content that was previously captured by a content capture device of the content capture system and that was encrypted and stored in the decentralized storage system. Responsive to determining that the received message does not comprise the CID in the body of the received message: obtaining the digital content that was previously captured by the content capture device of the content capture system from the body of the message.

Some embodiments include one or more of the following features. The message initiated by the content capture system comprises a HyperText Transfer Protocol (HTTP) POST request comprising at least metadata associated with the digital content that was previously captured by the content capture device. The decentralized storage system includes a file sharing peer-to-peer (P2P) network. The CID comprises a hashed value of the digital content that was previously captured by the content capture device, wherein the CID is generated by the decentralized storage system.

In some embodiments, the method may include obtaining the content identified by the CID from the decentralized storage system, initiating decryption of the obtained content identified by the CID to obtain the digital content that was previously captured by the content capture device of the content capture system, and initiating deletion of the content identified by the CID from the decentralized storage system.

Another general aspect of the present disclosure includes a computer-implemented method that comprises obtaining digital content captured by a content capture device, determining a size attribute associated with the obtained digital content, obtaining a current transmission parameter associated with currently transmitting objects from a content capture system to an enterprise content management system, and determining whether a transmission file comprising the obtained digital content currently qualifies as a large file for transmission, based on the determined size attribute and the obtained current transmission parameter. In response to determining that the transmission file currently qualifies as a large file for transmission: initiating encryption and transmission of the obtained digital content to a decentralized storage system, and initiating transmission of a content identifier (CID) from the content capture system to the enterprise content management system, the CID identifying content stored in the decentralized storage system, the stored content comprising the encrypted digital content. In response to determining that the transmission file currently does not qualify as a large file for transmission: initiating transmission of the transmission file comprising the obtained digital content from the content capture system to the enterprise content management system.

Some embodiments include one or more of the following features. The CID is received from the decentralized storage system in response to the transmission of the obtained digital content to the decentralized storage system, prior to initiating transmission of the CID from the content capture system to the enterprise content management system. The decentralized storage system comprises an InterPlanetary File System (IPFS). The current transmission parameter associated with currently transmitting objects from the content capture system to the enterprise content management system comprises a current runtime upload speed determined in real time or near real time. The decentralized storage system comprises a content addressable storage system, wherein the CID identifies the stored content in the content addressable storage system. Initiating transmission of the transmission file comprising the obtained digital content from the content capture system to the enterprise content management system comprises initiating a HyperText Transfer Protocol (HTTP) POST request from the content capture system to a web server associated with the enterprise content management system, the HTTP POST request comprising the obtained digital content in a body portion of the HTTP POST request. Initiating transmission of the CID from the content capture system to the enterprise content management system comprises initiating a HyperText Transfer Protocol (HTTP) POST request from the content capture system to a web server associated with the enterprise content management system, the HTTP POST request comprising the CID in a body portion of the HTTP POST request.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
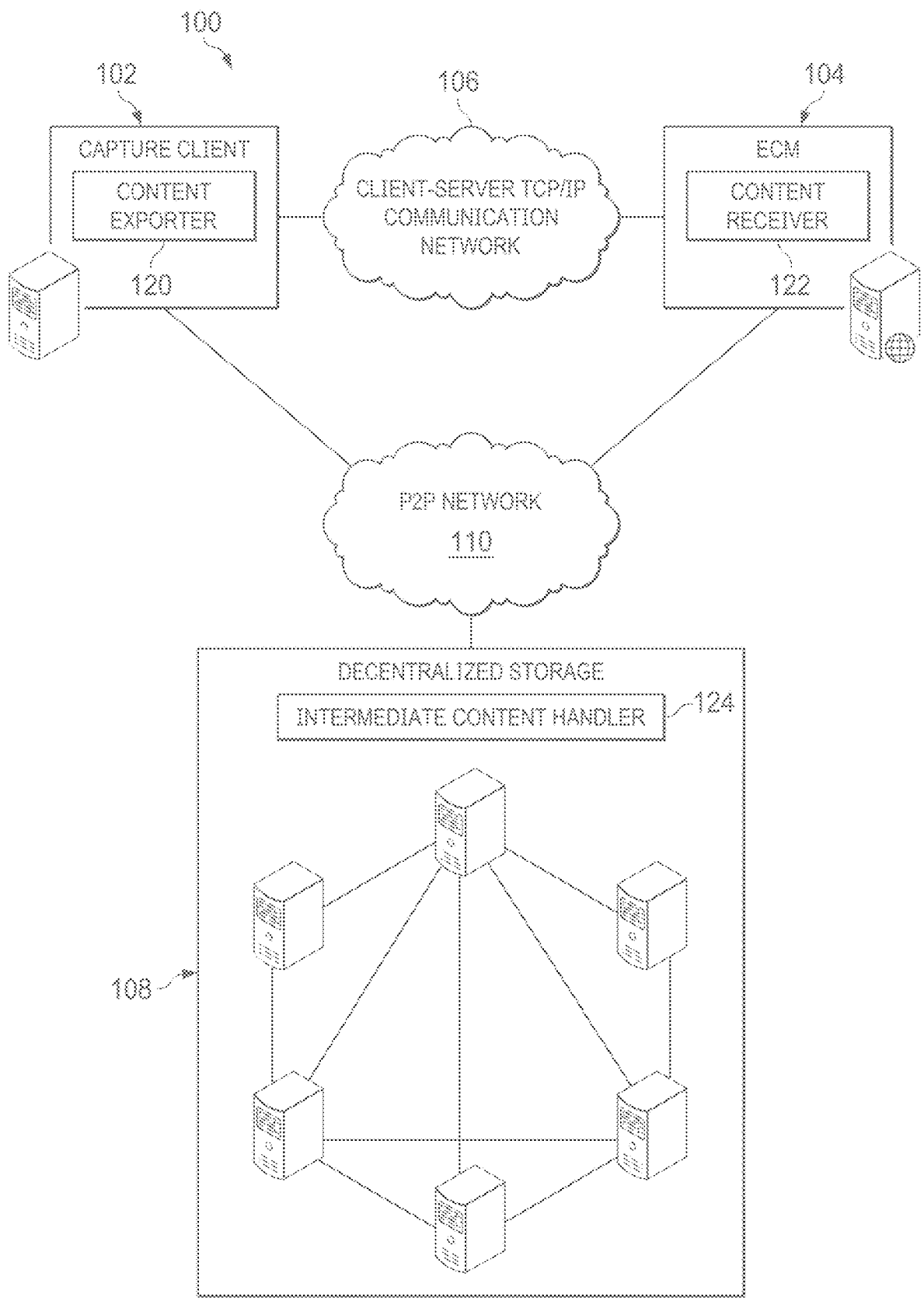
FIG. 1 is a diagrammatic representation of one embodiment of a system for transferring large files.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Embodiments provide systems and methods for securely transferring large files. A content capture device captures digital content for a content capture system. A size attribute of the digital content is determined (e.g., a size of a file comprising the digital content). A determination is made whether the digital content currently qualifies as a large file for transmission, based on the size attribute, configuration settings, and an upload speed of the network at runtime. If so, the digital content is encrypted and transmitted to a decentralized storage system, which returns a content identifier (CID) identifying the encrypted digital content stored in the decentralized storage system. The content capture system then transmits the CID, with metadata associated with the digital content, to a destination system, such as an enterprise content management system (ECM). The destination system can then read the encrypted digital content from the decentralized storage system, using the CID. Else, if the digital content currently does not qualify as a large file for transmission, the content capture system transmits the digital content, with the metadata, to the destination system.

For example, the transmissions from the content capture system to the destination system may utilize transmission via Transfer Control Protocol/Internet Protocol (TCP/IP) client-server network communication, while transmissions to and from the decentralized storage system may utilize P2P network communication. Thus, embodiments can provide secure, scalable techniques for export of large files from a content capture device, for example, by using a combination of client-server TCP/IP network communication and Peer-to-Peer (P2P) network communication, utilizing the P2P network as an intermediate storage medium for large files, and by dynamically optimizing system response in accordance with network bandwidth (or HTTP network upload speed) changes and document size. The captured data can be sent more securely by using the decentralized storage for large files, and transmission of only the CID for large files (in lieu of the captured content itself) via the client-server TCP/IP communication advantageously provides increased bandwidth availability for transferring smaller files, as well as improved network efficiency and overall throughput.

In some embodiments, if an initial attempt to export the digital content via the client-server TCP/IP communication fails (e.g., due to network congestion, faulty transmission hardware, etc.), the export may switch to utilizing the decentralized storage for the digital content of the failed attempt, in order to maintain smooth movement of incoming captured content (e.g., minimizing potential backlog of data during periods of slow TCP/IP movement of data being transmitted).

FIG. 1 is a diagrammatic representation of one embodiment of a system 100 for transferring large files. System 100 includes a capture client 102 that obtains digital content from a content capture device. For example, the capture client 102 may include a capture device such as a scanner that scans paper documents into digital content such as image files, portable document files (pdfs), text files, etc. For example, document capture solutions use capture processes to convert information from source documents, such as printed documents, faxes, and email messages, into digitized data, and to store the data and images into back-end systems for fast and efficient data retrieval. These solutions can help take control of large volumes of structured, unstructured, and semi-structured data and transform critical documents into process-ready digital content that can be integrated with broader, computer-facilitated, processes of an organization. Capture client 102 additionally comprises a content exporter 120 that manages export or transmission of captured content and associated metadata to other devices.

System 100 further includes an enterprise content management (ECM) system 104 that is configured to receive digital content and metadata from the capture client 102, via a network client-server Transfer Control Protocol/Internet Protocol (TCP/IP) communication network 106 employing client-server TCP/IP communication. For example, ECM system 104 comprises a content receiver 122 that manages receipt of captured content and associated metadata that is exported or transmitted from the capture client 102. System 100 further includes a decentralized storage system 108 employing a peer-to-peer (P2P) network 110 for communication, that is configured to receive encrypted digital content from the capture client 102 for storage in the decentralized storage system 108, and to return a content identifier (CID) to the capture client 102, via an application programming interface (API). The capture client may send the CID to the ECM system 104, which then may retrieve the encrypted content from the decentralized storage system 108 utilizing the P2P network 110 for communication via an application programming interface (API). Decentralized storage system 108 includes an intermediate content handler 124 for handling requests for intermediate storage and retrieval of the encrypted digital content.

In some embodiments, the decentralized storage system 108 comprises a plurality of computing devices operating as a P2P network utilizing content addressing for storage and retrieval. Conventionally, a peer-to-peer network is one in which two or more PCs share files and access to devices such as printers without requiring a separate server computer or server software. In some embodiments, the decentralized storage system 108 comprises an InterPlanetary File System (IPFS). The IPFS is a protocol, hypermedia and file sharing peer-to-peer (P2P) network for storing and sharing data in a distributed file system. IPFS uses content-addressing to uniquely identify each file in a global namespace connecting IPFS hosts. IPFS utilizes a decentralized system of user-operators who hold a portion of the overall data, creating a resilient system of file storage and sharing. Any user in the network can serve a file by its content address, and other peers in the network can find and request that content from any node who has it using a distributed hash table (DHT). Users may install an IPFS client on their device, where the IPFS client is configured to manage the user device interactions with the IPFS. Alternatively, users may choose not to install the IPFS client on their device and instead use a public gateway.

Figure 2:
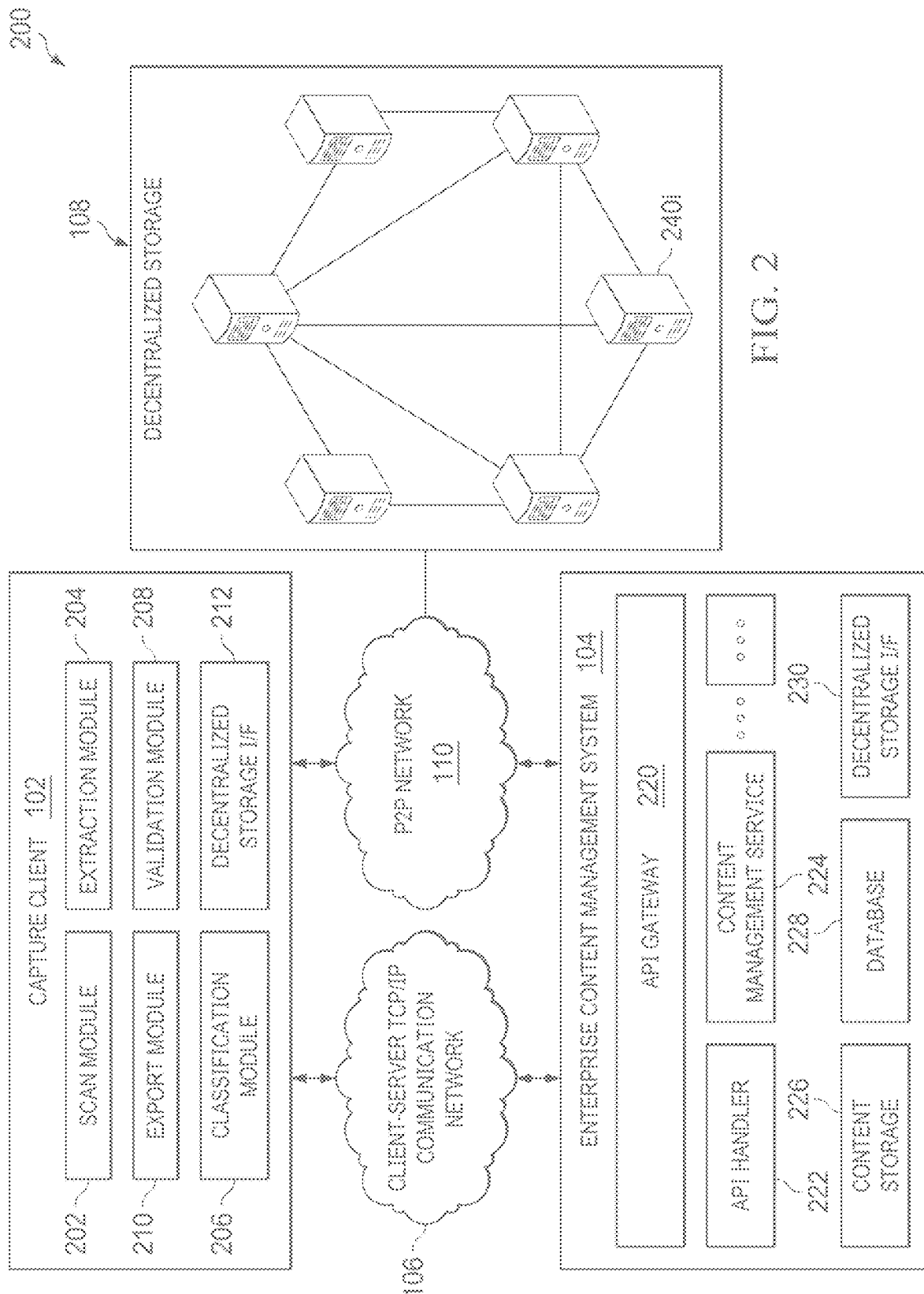
FIG. 2 is a diagrammatic representation of one embodiment of a system for transferring large files from a capture client to an enterprise content management system.

FIG. 2 is a diagrammatic representation of one embodiment of a system 200 for transferring large files. System 200 includes the capture client 102, the ECM system 104, and the decentralized storage system 108, illustrated in more detail. The capture client 102 includes a scan module 202, an extraction module 204, a classification module 206, a validation module 208, an export module 210, and a decentralized storage interface (I/F) 212.

In some embodiments, the scan module 202 interfaces with a scanner device to obtain scanned input such as digital image data. The digital image data can be processed, for example, in a recognition stage, in which text, machine markings or other data within an image is identified and extracted. For example, a recognition stage can include a classify stage and an extraction stage. In some embodiments, the classification module 206 utilizes automated classification technology to identify different document types through a combination of text- and image-based analysis. In some embodiments, classification includes detecting a document type corresponding to an associated data entry form. In some embodiments, the extraction module 204 extracts data from the digital content, for example through optical character recognition (OCR) and/or optical mark recognition (OMR) techniques. The validation module 208 then validates the extracted data. In various embodiments, validation may be performed at least in part by an automated process, for example by comparing multiple occurrences of the same value, by performing computations or other manipulations based on extracted data and other data. Automated validation may involve integration with another data source, usually a database or enterprise application such as enterprise resource planning (ERP). In various embodiments, all or a subset of extracted values, (e.g., those for which less than a threshold degree of confidence is achieved through automated extraction and/or validation), may be validated manually by a human indexer or other operator. Once all data has been validated, output is delivered at a delivery stage, for example, via the export module 210 or the decentralized storage I/F 212. During delivery, data and captured content such as document images may be exported and made available to other content repositories, databases, and business systems in a variety of formats.

Each module may perform a number of steps. For example, an image may have been captured and classified in prior stages. Extraction module 204 may perform OCR to convert pixels in the image into characters. In some embodiments, the image may be classified as being of a particular document type and the OCR processing may, based on the document type, be configured to perform OCR on specific zones in the image. In other embodiments, the OCR may include whole page recognition. Extraction module 204 may perform an analysis in which rules are applied to the recognized text to identify and tag meaningful entities. For example, rules may be applied to extract particular data among alternatives. For example, the extraction module 204 may apply rules to extract a particular date entry from among several detected date entries. Data obtained in the capture process (e.g., authors, dates, document types, etc.) may be formatted in JavaScript Object Notation (JSON) for export and storage as metadata associated with the captured content.

In some embodiments, export module 210 (e.g., via content exporter 120) initiates export of the data and captured content via the client-server TCP/IP communication network 106 that employs client-server TCP/IP communication, for example, utilizing HTTP POST requests directed to a web server of the ECM system 104. Generally, by using an HTTP POST request, an arbitrary amount of data of any type can be sent to a destination server in the body portion of the request message. Thus, conventionally, all captured content may be exported to the ECM system 104 via HTTP POST requests that carry the captured content (and associated metadata) in the body portions of the request messages. For small amounts of digital content (e.g., for small documents, small objects, and/or other files), such export techniques may provide satisfactory results. However, as the size of the captured content (e.g., a document size or file size) increases, the export using HTTP file transfer may utilize more bandwidth and time, which may result in HTTP connection timeout errors and network interruptions. While it may be possible to increase time limits for connection time-outs, system security may become compromised, at least due to slow HTTP attacks. Some embodiments utilize slow HTTP attack prevention strategies that include setting shorter length time outs and limiting the header and body size (or content size) of messages. In general, file sizes supported by HTTP servers are restricted to a maximum size limit for reasons related to performance, security and memory management. A general approach includes providing configuration settings and changing them manually when required, which involves permission issues and may be time consuming.

Thus, export module 210 may include instructions to determine whether captured content currently available for export (e.g., at runtime, in real time or near real time) should be handled as a large file for export. For example, the export module 210 instructions may obtain current export settings and a current runtime upload speed from a settings file (not shown) of the export module 210. Further, the export module 210 instructions may determine a size attribute of the captured content. The export module 210 instructions may determine whether the captured content is to be handled as a large file for export based on an analysis of the size attribute and/or current runtime parameters for exporting content from the content capture system to a receiving system, such as the ECM system 104. If so, the export module 210 instructions may initiate encryption of the captured content and storage of the encrypted content in the decentralized storage system 108, for example, via the decentralized storage interface 212. In response to storing the encrypted content, the decentralized storage system provides a content identifier (CID) to the content capture client 102, for example, via the decentralized storage interface 212. For example, the CID may include a hashed value of the encrypted content, and may be used for storage and retrieval of the encrypted content as stored in the content addressable decentralized storage system 108. The export module 210 instructions may then initiate an HTTP POST request, to transmit the content identifier (CID) and metadata, the CID identifying the encrypted content as stored in the decentralized storage. For example, the HTTP POST request may comprise a request with the CID included in the body of the request. As discussed above, the captured data is sent more securely by using the decentralized storage for large files, and transmission of only the CID for the large files (in lieu of the captured content itself) advantageously provides increased bandwidth availability for transferring smaller files, as well as improved network efficiency and overall throughput. The export module 210 instructions may then determine a current upload speed and update a runtime parameter in the settings file, to maintain a current status of the settings.

In some embodiments, the ECM system 104 includes an application programming interface (API) gateway 220, an API handler 222, a content management service 224, content storage 226, a database 228, and a decentralized storage I/F 230. The API gateway 220 can act as an API front-end, receives API requests, enforces throttling and security policies, passes requests to back-end services and then passes any responses back to a requester. In some embodiments, the API gateway 220 may comprise a server. In some embodiments, the API gateway 220 may also provide functions such as collecting analytics data and providing caching. The API gateway 220 can provide the functionality to support authentication, authorization, security, audit and regulatory compliance. API handler 222 comprises instructions that handle incoming requests and provide appropriate responses to an Application Programming Interface (API). APIs can be used to enable communication between different software applications, services, or systems. In some embodiments, API handler 222 acts as middleware that receives requests from a client and processes them, then sends back a response to the client. API handler 222 may be implemented as a standalone function or as part of a larger application. Example responsibilities of API handler 222 may include validating, parsing, and routing incoming API requests to the appropriate service or function that can handle the request. API handler 222 can also check the authenticity of the requests by verifying an API key, authentication credentials, and other security measures. In some embodiments, API handler 222 comprises an HTTP POST handler for managing incoming HTTP POST requests initiated at capture client 102. In some embodiments, content receiver 122 may include the API handler 222.

Content management service 224 can include any of a number of services provided by content management systems, including but not limited to, content capture and processing, payroll, human resources applications, document management, project management, contracts management, accounts receivable, accounts payable, etc. In some embodiments, content storage 226 may be implemented as a content repository that stores content and associated metadata. In some implementations, content metadata may be stored separately from associated content. Database 228 can comprise one or more databases configured to store and retrieve data, such as the captured content and metadata discussed herein. Decentralized storage I/F 230 provides functionality to enable communication between a first client device and other devices operating within the decentralized storage system 108.

The decentralized storage system 108 includes a plurality of P2P network devices 240i (P2P devices) that are networked via the P2P network 110 for communicating among the plurality of P2P network devices 240i, as well as communicating via interfaces with the capture client 102 and the ECM system 104 (e.g., via intermediate content handler 124). For example, when the capture client 102 determines, at runtime, that captured digital content currently qualifies as a large file for transmission, the capture client 102 encrypts the captured digital content and initiates transmission of the encrypted digital content to the decentralized storage system 108 via decentralized storage I/F 212. The encrypted digital content is then transmitted via the P2P network 110 to one or more of the P2P network devices 240i for storage. The decentralized storage system 108 then initiates transmission of a content identifier (CID), for the stored encrypted digital content, to the capture client 102. In one example embodiment, the decentralized storage system 108 is implemented as an InterPlanetary File System P2P network (using content addressable storage). In this example, a content identifier, or CID, is a label used to point to material in IPFS. The CID does not indicate where the content is stored, but instead forms a kind of address based on the content itself (e.g., uniquely identifying the file in a global namespace connecting IPFS hosts). CIDs are relatively short, regardless of the size of their underlying content, and can take different forms with different encoding bases or CID versions. As an example, a first CID in accordance with a first version (V0) may be determined as:
CID V0: QmbWqxBEKC3P8tqsKc98xmWNzrzDtRLMiMPL 8wBuTGsMnR and a second CID in accordance with a second version (V1) may be determined as:
CID V1: bafybeigdyrzt5sfp7udm7hu76uh7y26nf3efuylqabf3oc lgtqy55fbzdi Such CIDs are substantially shorter in length (i.e., embodied as substantially smaller files) than a typical file of digital captured content, and thus are substantially more likely to be exported via HTTP POST from the capture client 102 to the ECM system 104 without error, than exporting a substantially large file of digital captured content. For example, the first CID V0 comprises approximately 26 bytes (i.e., 26 characters), and the second CID V1 comprises approximately 59 bytes (59 characters). Thus, these example CIDs are substantially smaller than files comprising one or more megabytes (MB) of data, and may thus be substantially more likely to be exported via HTTP POST from the capture client 102 to the ECM system 104 without error, than exporting a substantially large file of digital captured content that comprises one or more MB digital captured content.

The decentralized storage system 108 may also be accessed, via the decentralized storage I/F 230, to enable the ECM system 104 to read the stored encrypted content, using the CID that has been sent from the capture client 102 to the ECM system 104. The decentralized storage system 108 can then delete the stored encrypted content from storage of the decentralized storage system 108, in response to a request received from the ECM system 104 to perform the deletion.

Figure 3:
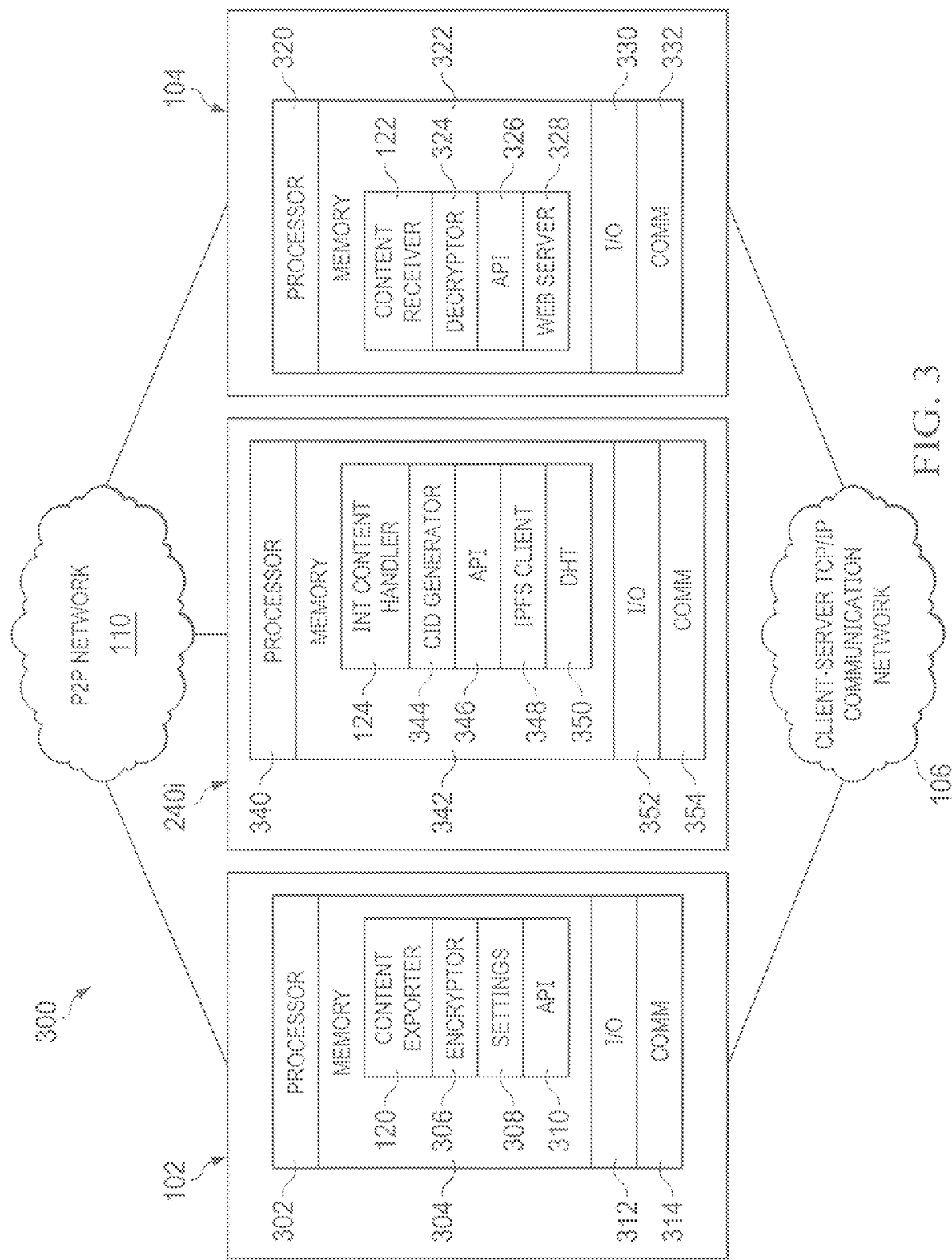
FIG. 3 is a diagrammatic representation of one embodiment of a system for transferring large files from a capture client to an enterprise content management system.

FIG. 3 is a diagrammatic representation of one embodiment of a system 300 for transferring large files. As illustrated, system 300 includes the capture client 102, the ECM system 104, and the decentralized storage system 108 (illustrated as a single device 240i), illustrated in more detail. As illustrated, client-server TCP/IP communication network 106 can be bi-directionally coupled to capture client 102 and ECM system 104. System 300 also includes a decentralized storage system that comprises a plurality of P2P network devices 240i (one P2P network device 240i is illustrated for simplicity in FIG. 3) that can be bi-directionally coupled via P2P network 110 to each of capture client 102 and ECM system 104.

In some embodiments, capture client 102 comprises a computer processor 302 and associated memory 304. Computer processor 302 may be an integrated circuit for processing instructions, such as, but not limited to a central processing unit (CPU). Memory 304 may include volatile memory, non-volatile memory, semi-volatile memory or a combination thereof. Memory 304, for example, may include RAM, ROM, flash memory, a hard disk drive, a solid-state drive, an optical storage medium (e.g., CD-ROM), or other computer readable memory or combination thereof. Memory 304 may implement a storage hierarchy that includes cache memory, primary memory and secondary memory. In some embodiments, memory 304 may include storage space on a data storage array. Capture client 102 may also include I/O devices 312 and a communication interface 314, such as a network interface card, to interface with client-server TCP/IP communication network 106, as well as the decentralized storage interface 212. In some embodiments, capture client 102 is a cloud computing system.

According to one embodiment, capture client 102 includes executable instructions stored on a non-transitory computer readable medium (e.g., memory 304) coupled to computer processor 302. The computer executable instructions of capture client 102 are executable to provide the content exporter 120. In some embodiments, the computer executable instructions are executable to provide a content exporter and an API. In an even more particular embodiment, the computer executable instructions are executable to provide a content exporter (e.g., content exporter 120) and associated API 310 (e.g., for interfacing with P2P network 110 via I/F 212, and for interfacing with client-server TCP/IP communication network 106). In some embodiments, capture client 102 includes a database, a file system, or other type of datastore or combination of datastores that acts as storage for captured content and associated metadata.

As illustrated, in some embodiments, the computer executable instructions are executable to provide an encryptor 306 to initiate encryption of captured content prior to its transmission to P2P network 110. In some embodiments, the encryption may be performed using conventional encryption techniques already known to those of skill in the art. In some embodiments, the encryption may be performed using techniques known only to the user and the ultimate recipient. The encryption may be performed locally, or may be performed by accessing an encryption service. Additionally, memory 304 may store settings file 308, which may also be stored in persistent storage (not shown in FIG. 3). Settings file 308 may include configuration settings that may be used by content exporter 120 to determine whether captured digital content currently qualifies as a large file for transmission, at runtime. For example, when the content exporter 120 determines, at runtime, that captured digital content currently qualifies as a large file for transmission, the content exporter 120 utilizes the encryptor 306 to encrypt the captured digital content and initiates transmission of the encrypted digital content to the decentralized storage system 108 via decentralized storage I/F 212. The encrypted digital content is then transmitted via the P2P network 110 to one or more of the P2P network devices 240$i$ for storage. The decentralized storage system 108 then initiates transmission of a content identifier (CID), for the stored encrypted digital content, to the capture client 102. The content exporter 120 then initiates transmission of the CID and metadata associated with the captured content to ECM system 104 via client-server TCP/IP communication network 106, for receipt by content receiver 122.

In some embodiments, ECM system 104 comprises a computer processor 320 and associated memory 322. Computer processor 320 may be an integrated circuit for processing instructions, such as, but not limited to a central processing unit (CPU). Memory 322 may include volatile memory, non-volatile memory, semi-volatile memory or a combination thereof. Memory 322, for example, may include RAM, ROM, flash memory, a hard disk drive, a solid-state drive, an optical storage medium (e.g., CD-ROM), or other computer readable memory or combination thereof. Memory 322 may implement a storage hierarchy that includes cache memory, primary memory and secondary memory. In some embodiments, memory 322 may include storage space on a data storage array. ECM system 104 may also include I/O devices 330 and a communication interface 332, such as a network interface card, to interface with client-server TCP/IP communication network 106, as well as the decentralized storage interface 212. In some embodiments, ECM system 104 is a cloud computing system.

According to one embodiment, ECM system 104 includes executable instructions stored on a non-transitory computer readable medium (e.g., memory 322) coupled to computer processor 320. The computer executable instructions of ECM system 104 are executable to provide the content receiver 122. For example, the content receiver 122 receives captured content from the capture client 102 directly, or from intermediate storage of the P2P network 110 as discussed further herein. In some embodiments, the computer executable instructions are executable to provide a content receiver and an API. In an even more particular embodiment, the computer executable instructions are executable to provide a content receiver (e.g., content receiver 122) and associated API 326 (e.g., for interfacing with P2P network 110 via I/F 212, and for interfacing with TCP/IP network 106). In some embodiments, ECM system 104 includes a database, a file system, or other type of datastore or combination of datastores that acts as storage for captured content and associated metadata.

As illustrated, in some embodiments, the computer executable instructions are executable to provide a decryptor 324 to initiate decryption of encrypted captured content following its retrieval from P2P network 110. The decryption may be performed locally, or may be performed by accessing an encryption/decryption service.

As illustrated, in some embodiments, the computer executable instructions are executable to provide access to web server 328. For example, the content exporter 120 may initiate export of captured content and associated metadata via an HTTP POST request (e.g., in accordance with one of the requests 700$a$ or 700$b$ illustrated in FIGS. 7A-7B) to web server 328 (e.g., via the API handler 222 (e.g., HTTP POST handler)). As discussed further herein, the HTTP POST request may include the content 706 in the body of request 700$a$ (e.g., when the captured content transmission file does not qualify as a large file for transmission, based on the determined size attribute and the obtained current transmission parameter), or it may instead include the CID 716 (and not the actual captured content) in the body of request 700$a$ (e.g., when the captured content transmission file qualifies as a large file for transmission, based on the determined size attribute and the obtained current transmission parameter, or e.g., based on determining that a prior transmission of the captured content failed).

The content receiver 122 receives the transmission of the CID and metadata associated with the captured content via client-server TCP/IP communication network 106, from capture client 102, or the transmission of the captured content and metadata associated with the captured content via client-server TCP/IP communication network 106, from capture client 102. When the content receiver 122 receives the CID from the capture client 102, the content receiver 122 initiates a read of the encrypted captured content from the P2P network 110 (e.g., via transmission of the CID to a device 240$i$ of the P2P network 110), initiates decryption of the encrypted captured content after its retrieval, and initiates removal of the encrypted captured content from the P2P network devices 240$i$ of the P2P network 110 (e.g., deletion of the encrypted captured content from P2P network 110), via decentralized storage I/F 230. ECM system 104 may then initiate further processing of the captured content, such as storage and retrieval processing to/from one or more repositories and/or databases.

In some embodiments, a P2P network device 240$i$ that forms part of P2P network 110, comprises a computer processor 340 and associated memory 342. Computer processor 340 may be an integrated circuit for processing instructions, such as, but not limited to a central processing unit (CPU). Memory 342 may include volatile memory, non-volatile memory, semi-volatile memory or a combination thereof. Memory 342, for example, may include RAM, ROM, flash memory, a hard disk drive, a solid-state drive, an optical storage medium (e.g., CD-ROM), or other computer readable memory or combination thereof. Memory 342 may implement a storage hierarchy that includes cache memory, primary memory and secondary memory. In some embodiments, memory 342 may include storage space on a data storage array. A P2P network device 240$i$ may also include I/O devices 352 and a communication interface 354, such as a network interface card, to interface with networks, as well as a decentralized storage interface. In some embodiments, P2P network device 240$i$ is a cloud computing system.

According to one embodiment, P2P network device 240$i$ includes executable instructions stored on a non-transitory computer readable medium (e.g., memory 342) coupled to computer processor 340. The computer executable instructions of P2P network device 240$i$ are executable to provide the intermediate content handler 124. In some embodiments, the computer executable instructions are executable to provide a content exporter and an API. In an even more particular embodiment, the computer executable instructions are executable to provide an intermediate content hander (e.g., intermediate content handler 124) and associated API 346 (e.g., for interfacing with P2P network 110). In some embodiments, intermediate content handler 124 includes or is coupled to a CID generator 344 to generate CIDs. In some embodiments, P2P network device 240i includes a database, a file system, or other type of datastore or combination of datastores that acts as storage for captured content and associated metadata.

As illustrated, in some embodiments, the computer executable instructions are executable to provide an IPFS client 348 to manage P2P interaction within the P2P network 110, implemented as an InterPlanetary File System. Additionally, memory 342 may store a distributed hash table (DHT 350). Alternatively, memory may store instructions to enable P2P network device 240i to access a DHT stored external to P2P network device 240i. As discussed above, any user in the P2P network can serve a file by its content address, and other peers in the network can find and request that content from any node who has it using a distributed hash table (DHT). Users may install an IPFS client on their device, where the IPFS client is configured to manage the user device interactions with the IPFS.

For example, when the content exporter 120 determines, at runtime, that captured digital content currently qualifies as a large file for transmission, the content exporter 120 utilizes the encryptor 306 to encrypt the captured digital content and initiates transmission of the encrypted digital content to the decentralized storage system 108 via decentralized storage I/F 212. The encrypted digital content is then transmitted via the P2P network 110 to one or more of the P2P network devices 240i for storage. The decentralized storage system 108 then initiates transmission of a CID, for the stored encrypted digital content, to the capture client 102, for example, by intermediate content handler 124. For example, the intermediate content handler 124 may obtain a hashed value of the encrypted digital content to generate the CID, initiate storage of the hashed value in the DHT, prior to transmission of the CID to the capture client 102. The content exporter 120 then initiates transmission of the CID and metadata associated with the captured content to ECM system 104 via client-server TCP/IP communication network 106, for receipt by content receiver 122.

As discussed above, when the content receiver 122 receives the CID from the capture client 102, the content receiver 122 initiates a read of the encrypted captured content from the P2P network 110 utilizing the DHT 350, for transmission of the encrypted captured content to the ECM system 104. Upon receipt of a deletion request (e.g., that includes the CID) from the ECM system 104, the P2P network device 240i may initiate removal (e.g., deletion) of the encrypted captured content from the P2P network 110, utilizing the CID and the DHT 350 to locate the stored data, and to remove the hashed value from the DHT 350 after full removal of the data associated with the CID from the P2P network.

Figure 4:
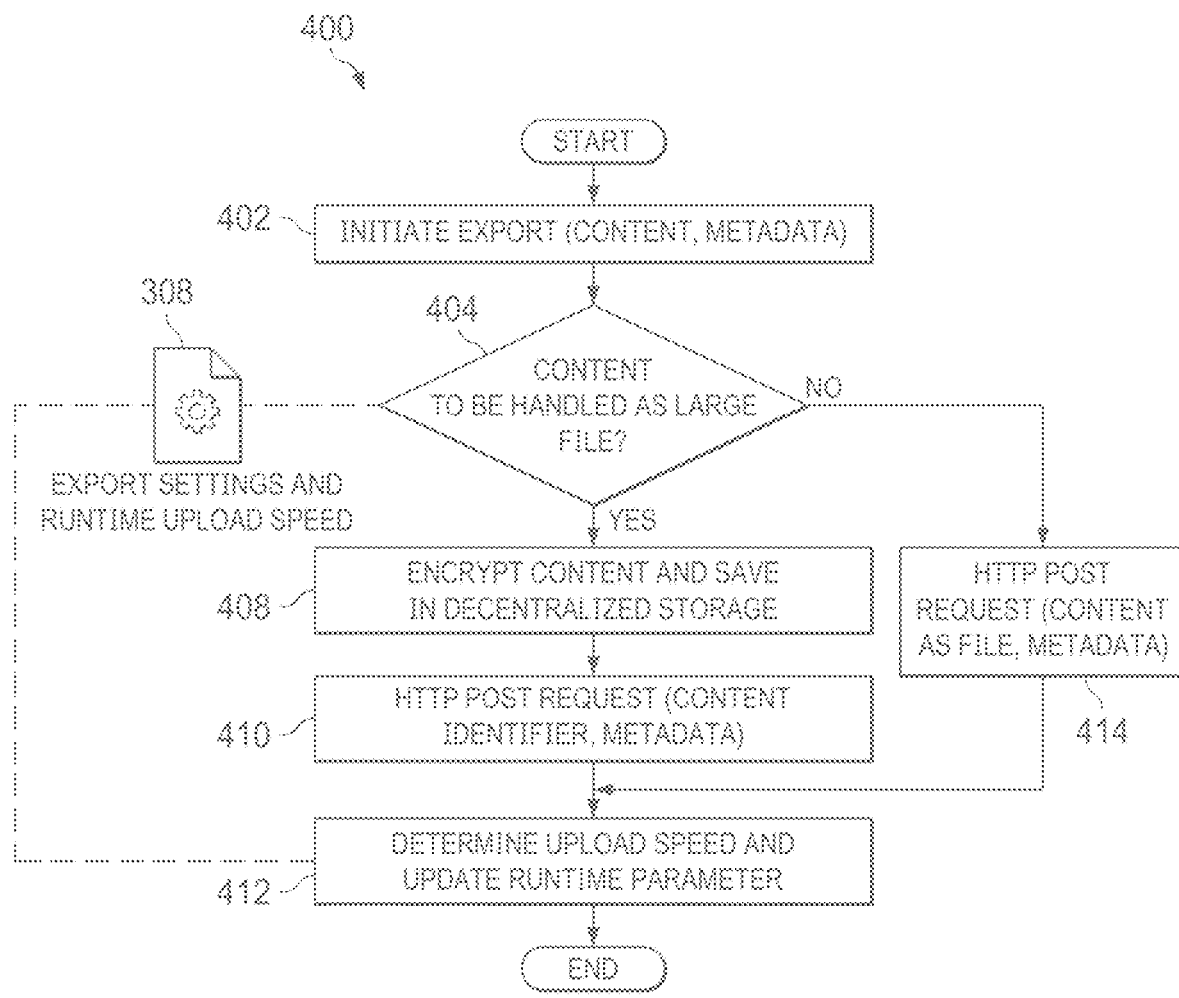
FIG. 4 is a flowchart illustrating one embodiment of a method for transferring large files.
Figure 7A:
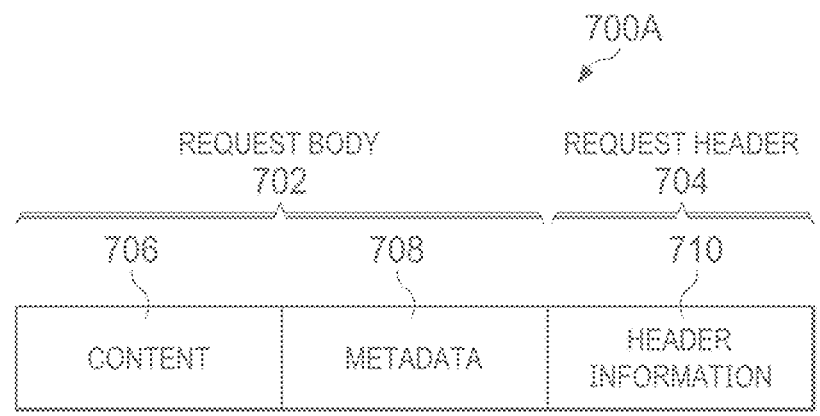
FIG. 7A is a diagrammatic representation of one embodiment of an HTTP POST request for transferring captured digital content.
Figure 7B:
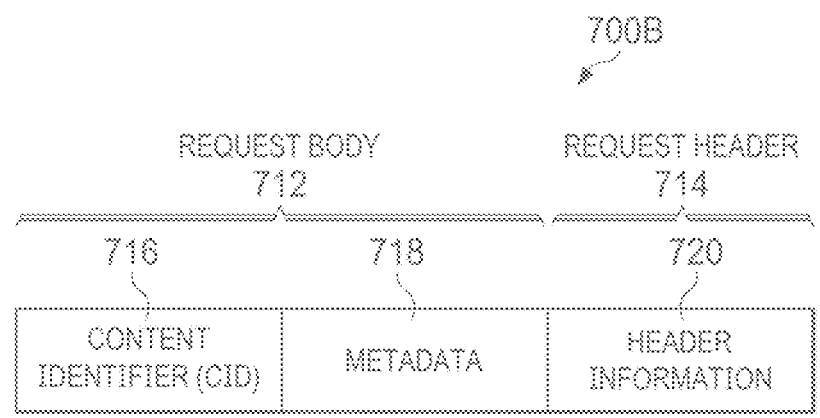
FIG. 7B is a diagrammatic representation of one embodiment of an HTTP POST request for transferring a content identifier (CID) for captured digital content stored in a decentralized storage system.

FIG. 4 is a flowchart illustrating one embodiment of a method 400 for transferring captured content from a content capture system to an enterprise content management system. In one embodiment, the steps of FIG. 4 may be embodied as computer-executable instructions stored on a non-transitory, computer-readable medium. At step 402, a content capture system, such as capture client 102, initiates an export request, for exporting content and metadata. For example, the content exporter 120 may initiate the export request. For example, the content may include captured content that has been captured by a capture device of the content capture system, such as a scanner managed by the scan module 202. At step 404, the content capture system determines whether the content is to be handled as a large file for export. For example, the content capture system may obtain current export settings and a current runtime upload speed from the settings file 308. Further, the content capture system may determine a size attribute of the content. The content capture system may determine whether the content is to be handled as a large file for export based on an analysis of the size attribute and/or current runtime parameters for exporting content from the content capture system to a receiving system, such as the ECM system 104. The content capture system may determine whether the content is to be handled as a large file for export based on default settings on a web server, such that the content exporter 120 may determine that a transmission file comprising the obtained digital content currently qualifies as a large file for transmission if the size of the transmission file exceeds a default maximum file size value. If so, at step 408, the content capture system initiates encryption of the content and storage of the encrypted content in decentralized storage, such as the decentralized storage system 108, for example, via the decentralized storage interface 212. In response to storing the encrypted content, the decentralized storage system provides a content identifier (CID) to the content capture system, for example, via the decentralized storage interface 212. For example, the CID may include a hashed value of the encrypted content, and may be used for storage and retrieval of the encrypted content as stored in the content addressable decentralized storage system 108. At step 410, the content capture system initiates an HTTP POST request, to transmit the content identifier (CID) and metadata, the CID identifying the encrypted content as stored in the decentralized storage. For example, the HTTP POST request may comprise a request 700b with the CID 716 included in the request body 702 of the request, as illustrated in FIG. 7B. As discussed above, the captured data is sent more securely by using the decentralized storage for large files, and transmission of only the CID for the large files (in lieu of the captured content itself) advantageously provides increased bandwidth availability for transferring smaller files, as well as improved network efficiency and overall throughput. At step 412, the content capture system determines a current upload speed and updates a runtime parameter in the settings file 308.

If, at step 404, the content is not determined to be handled as a large file, then at step 414, the content capture system initiates an HTTP POST request, to transmit the captured content as a file, with metadata associated with the captured content. For example, the HTTP POST request may comprise a request 700a with the captured content 706 included in the request body 702 of the request, as illustrated in FIG. 7A.

FIG. 4 is merely an illustrative example, and the disclosed subject matter is not limited to the ordering or number of steps illustrated. Embodiments may implement additional steps or alternative steps, omit steps, or repeat steps.

Figure 5:
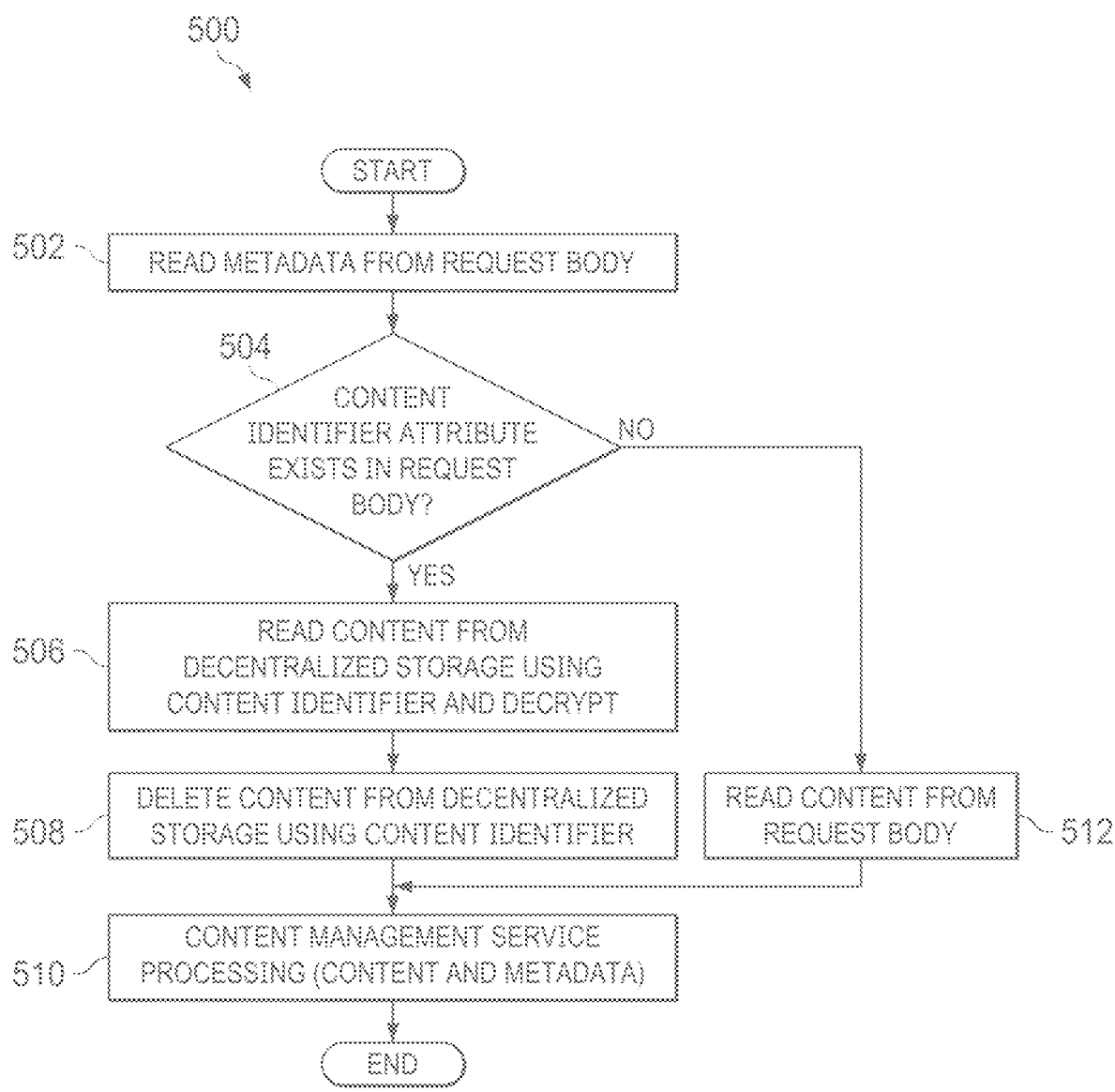
FIG. 5 is a flowchart illustrating one embodiment of a method for receiving large files.

FIG. 5 is a flowchart illustrating one embodiment of a method 500 for receiving captured content transferred from a content capture system to an enterprise content management system via an export request. In one embodiment, the steps of FIG. 5 may be embodied as computer-executable instructions stored on a non-transitory, computer-readable medium. At step 502, the enterprise content management system reads metadata from the request body. For example, the metadata may include the metadata transferred by either step 410 or step 412 discussed above (e.g., shown as metadata 708 or metadata 718 in FIGS. 7A-7B. At step 504, the enterprise content management system determines whether a CID attribute exists in the body of the request. For example, an HTTP POST request may comprise a request 700b with the CID 716 included in the request body 712, as illustrated in FIG. 7B. If so, then at step 506, the enterprise content management system initiates a read of encrypted content from the decentralized storage system, for example, via the decentralized storage interface 230, using the CID 716. The enterprise content management system then decrypts the encrypted content. At step 508, the enterprise content management system initiates deletion of the encrypted content from the decentralized storage system, for example, via the decentralized storage interface 230, using the CID 716. At step 510, the content management service 224 processes the decrypted content and the metadata 718 that was read from the request body 712. For example, the content management service 224 may initiate storage of the decrypted content and the metadata in content storage 226, and may update database 228. If, at step 504, it is determined that a CID attribute does not exist in the body of the request, such as illustrated in FIG. 7A, then at step 512, the enterprise content management system reads the content 706 from the request body 702, and control is passed to step 510, where content management service 224 processes the content 706 and the metadata 708 that were both read from the request body 702.

FIG. 5 is merely an illustrative example, and the disclosed subject matter is not limited to the ordering or number of steps illustrated. Embodiments may implement additional steps or alternative steps, omit steps, or repeat steps.

Figure 6:
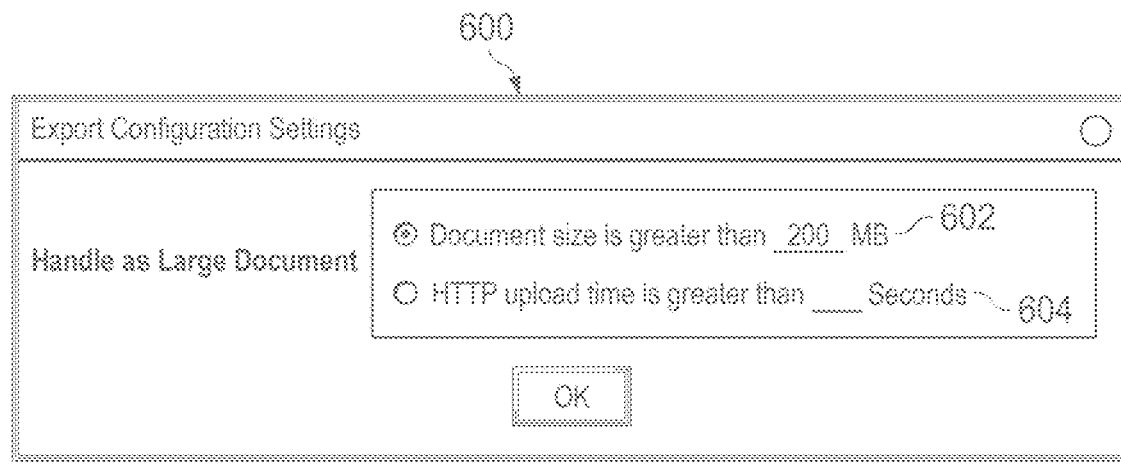
FIG. 6 is a diagrammatic representation of one embodiment of an interface for user input of export configuration settings.

FIG. 6 is a diagrammatic representation of one embodiment of an interface 600 for user input of export configuration settings. In the example illustrated, interface 600 displays selections 602 and 604 for user input. For example, interface 600 may be implemented as an application displaying user selections in a browser executing on a device of capture client 102. For example, the device may include input devices such as a keyboard (e.g., hardware or virtual keyboard), a mouse (or other selecting hardware), and a display screen. In the example illustrated, selection 602 includes user input indicating that content is to be handled as a large document if a document size is determined to be greater than 200 MB (megabytes), where the number of megabytes is provided by the user. Thus, with this user selection, any captured content having size greater than 200 MB will be determined as a large file for purposes of export, at runtime. Selection 604 includes input indicating that content is to be handled as a large document if HTTP upload time is greater than a number of seconds, where the number of seconds is provided by the user. For example, if a user enters an HTTP upload time as 60 seconds, then at runtime, if an HTTP upload speed is determined as currently 1 Mbps (1 megabyte per second, determined as the current value at runtime), then any file greater than 60 MB will be determined as a large file for purposes of export, at runtime (since its upload time would require 60 seconds). Selections entered by the user via interface 600 may be maintained, for example, in the export settings file 308, for use at runtime.

HTTP web servers may also be configured with maximum file size parameters for HTTP requests for reasons related to performance, security and memory management. In some environments, web servers are provided with configuration settings that can be adjusted manually. For example, a default value for a maximum file size for uploading documents in an APACHE TOMCAT WEB SERVER may be 200 MB, while a default value for a maximum file size for uploading documents in a MICROSOFT INTERNET INFORMATION SERVICES (IIS) WEB SERVER may be 30 MB. Thus, with these default settings on a web server, the content exporter 120 may determine that a transmission file comprising the obtained digital content currently qualifies as a large file for transmission if the size of the transmission file exceeds a default maximum file size value.

FIG. 7A is a diagrammatic representation of one embodiment of an HTTP POST request 700a for transferring of captured digital content. In the example illustrated, the HTTP POST request 700a includes a request body 702 and a request header 704. As shown, the request body 702 includes content 706 and metadata 708. Additionally, the request header 704 includes header information 710. In some embodiments, the HTTP POST request 700a omits the request header 704. As discussed herein, embodiments may utilize the HTTP POST request 700a for transferring files that are not determined to include content that is to be handled as a large file for export based on an analysis of the size attribute and/or current runtime parameters for exporting content from the content capture system to a receiving system.

FIG. 7B is a diagrammatic representation of one embodiment of an HTTP POST request for transferring a content identifier (CID) for captured digital content stored in a decentralized storage system. In the example illustrated, the HTTP POST request 700b includes a request body 712 and a request header 714. As shown, the request body 712 includes content identifier (CID) 716 and metadata 718. Additionally, the request header 714 includes header information 720. In some embodiments, the HTTP POST request 700b omits the request header 714. As discussed herein, embodiments may utilize the HTTP POST request 700b for transferring files that are determined to include content that is to be handled as a large file for export based on an analysis of the size attribute and/or current runtime parameters for exporting content from the content capture system to a receiving system. As discussed herein, the captured data is sent more securely by using the decentralized storage for large files, and transmission of only the CID (in lieu of the captured content itself) advantageously provides increased bandwidth availability for transferring smaller files, as well as improved network efficiency and overall throughput.

Figure 8:
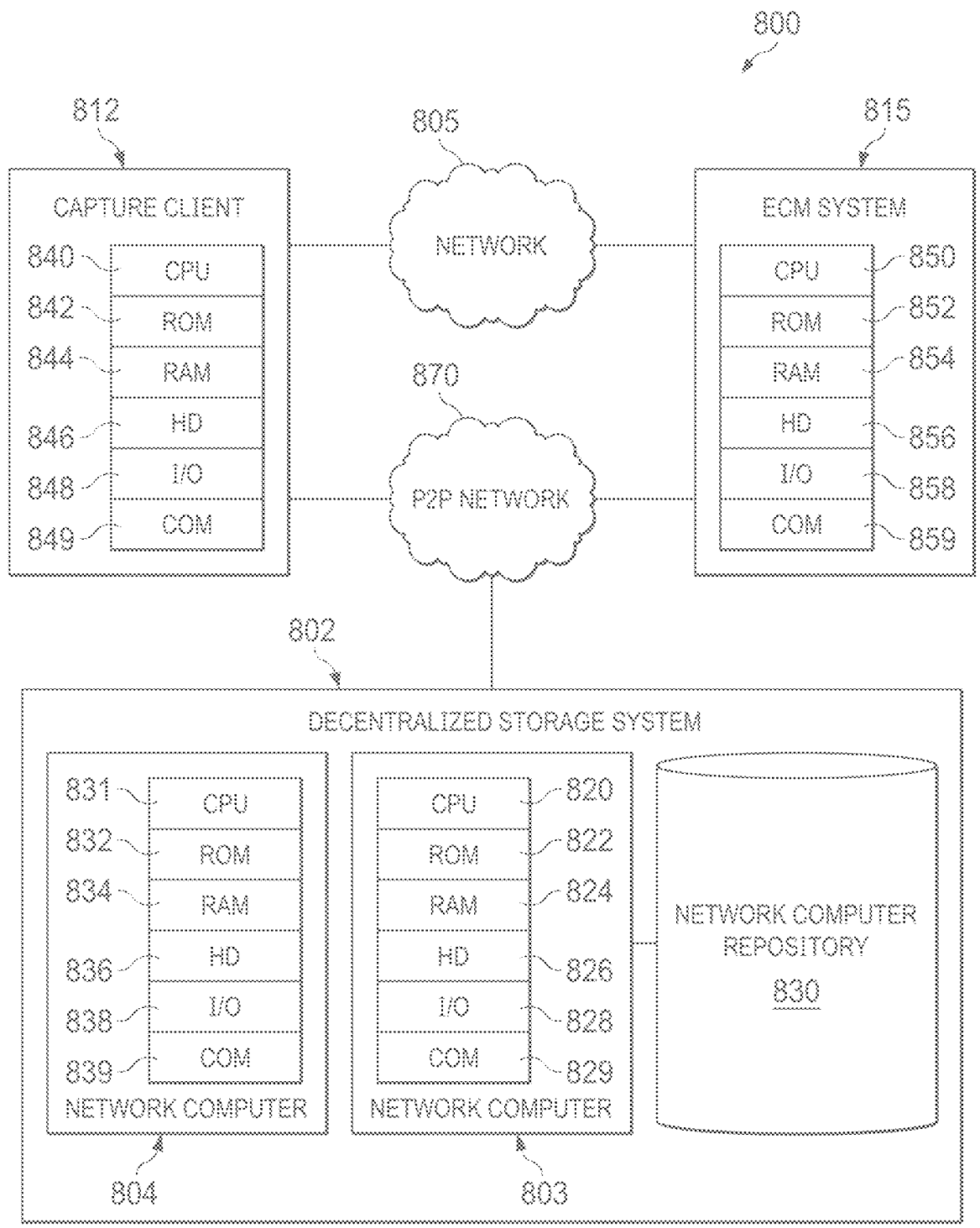
FIG. 8 depicts a diagrammatic representation of a network computing environment where embodiments disclosed herein can be implemented.

FIG. 8 depicts a diagrammatic representation of a network computing environment where embodiments disclosed herein can be implemented. In the example illustrated, network computing environment 800 includes network 805 that can be bi-directionally coupled to capture client computer 812 and ECM system 815. Network computing environment 800 also includes decentralized storage system 802 that can be bi-directionally coupled via P2P network 870 to each of capture client computer 812 and ECM system 815. Decentralized storage system 802 comprises a network computer 803 and a network computer 804. Network computer 803 can be bi-directionally coupled to data store 830. Network 805 may represent a combination of wired and wireless networks that network computing environment 800 may utilize for various types of network communications known to those skilled in the art. In particular, network 805 may support TCP/IP communications (e.g., HTTP POST requests). In one embodiment, capture client computer 812 may capture and process images and/or other content and provide the captured content and metadata to ECM system 815 (e.g., via an HTTP POST request), when a file embodying the captured content is determined as not being a large file for transmission to ECM system 815. In one embodiment, capture client computer 812 may capture and process images and/or other content and provide an encrypted version of the captured content to decentralized storage system 802 via P2P network 870, when a file embodying the captured content is determined as being a large file for transmission to ECM system 815. For the large file case, the decentralized storage system 802 then stores the encrypted version of the captured content provides a content identifier (CID) for the stored content to the capture client computer 812, whereupon the capture client computer 812 provides the CID (i.e., not the captured content itself) and metadata to ECM system 815 (e.g., via an HTTP POST request). In this case, ECM system 815 utilizes the CID (sent from capture client computer 812 to ECM system 815), to initiate a read of the encrypted version of the captured content from decentralized storage system 802 via P2P network 870 (e.g., via decentralized storage I/F 230).

For the purpose of illustration, a single system is shown for each of computer 803, 804, 812 and computer 815. However, with each of computer 803, 804, 812 and computer 815, a plurality of computers (not shown) may be interconnected to each other over network 805 and P2P network 870. For example, a plurality of computers 812 and a plurality of computers 815 may be coupled to network 805. Computers 812 may include data processing systems for communicating with computer 803 and/or 804. Computers 815 may include systems for transferring captured content to other processing and storage facilities.

Capture client computer 812 may recognize and extract information from images and/or other sources as discussed above. The extracted information may be classified and otherwise interpreted and provided to backend systems, such as ECM system 815.

Decentralized storage computer 803 can include central processing unit ("CPU") 820, read-only memory ("ROM") 822, random access memory ("RAM") 824, storage memory 826 (e.g., a hard drive (HD) or other persistent storage), input/output device(s) ("I/O") 828 and communication interface 829. I/O 828 can include a keyboard, monitor, printer, electronic pointing device (e.g., mouse, trackball, stylus, etc.), or the like. Communications interface may include a communications interface, such as a network interface card, to interface with network 805. Computer 804 may be similar to computer 803 and can comprise CPU 831, ROM 832, RAM 834, HD 836, I/O 838 and communications interface 839. Computers 803, 804 may include one or more backend systems configured for providing a variety of services to computers 812 and 815 over P2P network 870. These services may utilize data stored in data store 830.

Capture client computer 812 can comprise CPU 840, ROM 842, RAM 844, HD 846, I/O 848 and communications interface 849. I/O 848 can include a keyboard, monitor, printer, electronic pointing device (e.g., mouse, trackball, stylus, etc.), or the like. Communications interface 849 may include a communications interface, such as a network interface card, to interface with network 805. Communications interface 849 may also include the decentralized storage I/F 212 to interface with P2P network 870. The settings file 308, discussed above, that stores export settings and runtime upload speed, may be stored in RAM 844 and/or HD 846. In some embodiments, the export settings may be provided by a user entering the information via a user interface (e.g. a graphical user interface), for example, using a keyboard and monitor. ECM system 815 may similarly include CPU 850, ROM 852, RAM 854, HD 856, I/O 858 and communications interface 859. Communications interface 859 may also include the decentralized storage I/F 230 to interface with P2P network 870. According to one embodiment, the decentralized storage system 108 may comprise a plurality of computers similar to network computer 803 and 804, operating as part of the P2P network 110.

Each of the computers in FIG. 8 may have more than one CPU, ROM, RAM, HD, I/O, or other hardware components.

For the sake of brevity, each computer is illustrated as having one of each of the hardware components, even if more than one is used. Each of computers 803, 804, 812 and 815 is an example of a data processing system. ROM 822, 832, 842, and 852; RAM 824, 834, 844 and 854; storage memory 826, 836, 846 and 856; and data store 830 can include media that can be read by CPU 820, 831, 840, or 850. Therefore, these types of memories include non-transitory computer-readable storage media. These memories may be internal or external to computers 803, 804, 812, or 815.

Portions of the methods described herein may be implemented in suitable software code that may reside within ROM 822, 832, 842, or 852; RAM 824, 834, 844, or 854; or storage memory 826, 836, 846, or 856. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. A "computer-readable medium" may be any type of data storage medium that can store computer instructions that are translatable by a processor. Examples of computer-readable media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like. Data may be stored in a single storage medium or distributed through multiple storage mediums, and may reside in a single database or multiple databases (or other data storage).

A "processor" includes any hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit CPU or other processor, memory (e.g., primary or secondary memory such as RAM, ROM, HD or other computer readable medium for the persistent or temporary storage of instructions and data) and an input/output ("I/O") device. The I/O device can include a keyboard, monitor, printer, electronic pointing device (for example, mouse, trackball, stylus, etc.), touch screen or the like. In embodiments, the computer has access to at least one database on the same hardware or over the network.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise. Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the figures can also be implemented in a more separated or integrated manner, or even removed or rendered as inoperable in certain cases, as is useful in accordance with a particular application. Additionally, any signal arrows in the figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

In the foregoing specification, the invention has been described with reference to specific embodiments. However, one of ordinary skill in the art appreciates that various modifications and changes can be made without departing from the scope of the invention. Accordingly, the specification, including the Summary, Abstract and figures are to be regarded in an illustrative rather than a restrictive sense, and all such modifications are intended to be included within the scope of invention.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine-readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A system comprising:
    a processor; and
    a non-transitory computer-readable medium storing instructions that are executable by the processor for:
        obtaining digital content captured by a content capture device;
        determining a size attribute associated with the obtained digital content;
        obtaining a transmission parameter associated with transmission of objects to a receiving system;
        selecting an initial destination for the obtained digital content based on the obtained transmission parameter and the determined size attribute, the selecting including selecting between the receiving system and a decentralized storage system as the initial destination; and
        initiating transmission of the obtained digital content to the selected initial destination.

2. The system of claim 1, wherein the selected initial destination includes the decentralized storage system,
    wherein initiating transmission of the digital content to the selected initial destination includes obtaining an encrypted file of the obtained digital content by initiating encryption of the obtained digital content prior to transmission of the encrypted file to the decentralized storage system, and
    wherein the instructions are executable by the processor for obtaining a content identifier (CID) that includes a content address associated with storage of the obtained digital content in the decentralized storage system.

3. The system of claim 1, wherein the instructions are executable by the processor for initiating transmission of a content identifier (CID) to the receiving system, wherein the CID includes a content address associated with storage and retrieval of the obtained digital content in the decentralized storage system.

4. The system of claim 1, wherein the selected initial destination includes the receiving system,
    wherein initiating transmission of the digital content to the selected initial destination comprises initiating a HyperText Transfer Protocol (HTTP) POST request to the receiving system, the HTTP POST request comprising the digital content in a body portion of the HTTP POST request.

5. The system of claim 1, wherein the decentralized storage system comprises a file sharing peer-to-peer (P2P) network.

6. The system of claim 1, wherein obtaining the transmission parameter associated with transmission of objects to the receiving system includes obtaining one or more of:
    a user selection of a numeric size of an object for transmission,
    a user selection of a temporal size of an upload time limit,
    a default maximum numeric size of an object for upload by a web server, or
    a runtime network upload speed.

7. The system of claim 1, wherein the instructions are executable by the processor for determining a current runtime upload speed and updating a runtime parameter in a settings file, after initiating the transmission of the obtained digital content to the selected initial destination.

8. The system of claim 1, wherein the content capture device comprises a document scanning device.

9. The system of claim 1, wherein obtaining the digital content comprises obtaining output from a document scanner configured to scan paper documents to digital documents.

10. A computer-implemented method comprising:
   receiving, at an enterprise content management system, a message initiated by a content capture system;
   parsing the received message to determine whether the received message comprises a content identifier (CID) in a body of the received message, the CID identifying content stored in a decentralized storage system;
   responsive to determining that the received message comprises the CID in the body of the received message:
      providing the CID to the decentralized storage system to initiate retrieval of the content identified by the CID, the content comprising digital content that was previously captured by a content capture device of the content capture system and that was encrypted and stored in the decentralized storage system; and
   responsive to determining that the received message does not comprise the CID in the body of the received message:
      obtaining the digital content that was previously captured by the content capture device of the content capture system from the body of the message.

11. The computer-implemented method of claim 10, wherein the message initiated by the content capture system comprises a HyperText Transfer Protocol (HTTP) POST request comprising at least metadata associated with the digital content that was previously captured by the content capture device.

12. The computer-implemented method of claim 10, further comprising:
   obtaining the content identified by the CID from the decentralized storage system;
   initiating decryption of the obtained content identified by the CID to obtain the digital content that was previously captured by the content capture device of the content capture system; and
   initiating deletion of the content identified by the CID from the decentralized storage system.

13. The computer-implemented method of claim 10, wherein the decentralized storage system includes a file sharing peer-to-peer (P2P) network.

14. The computer-implemented method of claim 10, wherein the CID comprises a hashed value of the digital content that was previously captured by the content capture device, wherein the CID is generated by the decentralized storage system.

15. A computer-implemented method comprising:
   obtaining digital content captured by a content capture device;
   determining a size attribute associated with the obtained digital content;
   obtaining a current transmission parameter associated with currently transmitting objects from a content capture system to an enterprise content management system;
   determining whether a transmission file comprising the obtained digital content currently qualifies as a large file for transmission, based on the determined size attribute and the obtained current transmission parameter;
   responsive to determining that the transmission file currently qualifies as a large file for transmission:
      initiating encryption and transmission of the obtained digital content to a decentralized storage system, and
      initiating transmission of a content identifier (CID) from the content capture system to the enterprise content management system, the CID identifying stored content in the decentralized storage system, the stored content comprising the encrypted digital content; and
   responsive to determining that the transmission file currently does not qualify as a large file for transmission:
      initiating transmission of the transmission file comprising the obtained digital content from the content capture system to the enterprise content management system.

16. The computer-implemented method of claim 15, further comprising:
   receiving the CID from the decentralized storage system in response to the transmission of the obtained digital content to the decentralized storage system, prior to initiating transmission of the CID from the content capture system to the enterprise content management system,
   wherein the decentralized storage system comprises an InterPlanetary File System (IPFS).

17. The computer-implemented method of claim 15, wherein the current transmission parameter associated with currently transmitting objects from the content capture system to the enterprise content management system comprises a current runtime upload speed determined in real time or near real time.

18. The computer-implemented method of claim 15, wherein the decentralized storage system comprises a content addressable storage system, wherein the CID identifies the stored content in the content addressable storage system.

19. The computer-implemented method of claim 15, wherein initiating transmission of the transmission file comprising the obtained digital content from the content capture system to the enterprise content management system comprises initiating a HyperText Transfer Protocol (HTTP) POST request from the content capture system to a web server associated with the enterprise content management system, the HTTP POST request comprising the obtained digital content in a body portion of the HTTP POST request.

20. The computer-implemented method of claim 15, wherein initiating transmission of the CID from the content capture system to the enterprise content management system comprises initiating a HyperText Transfer Protocol (HTTP) POST request from the content capture system to a web server associated with the enterprise content management system, the HTTP POST request comprising the CID in a body portion of the HTTP POST request.

* * * * *